(12) United States Patent
Ramamurthi

(10) Patent No.: US 8,666,932 B2
(45) Date of Patent: *Mar. 4, 2014

(54) SYSTEM AND METHOD FOR PROVIDING VECTOR TERMS RELATED TO INSTANT MESSAGING CONVERSATIONS

(75) Inventor: Shiv Ramamurthi, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/534,559

(22) Filed: Jun. 27, 2012

(65) Prior Publication Data
US 2012/0265747 A1  Oct. 18, 2012

Related U.S. Application Data

(63) Continuation of application No. 13/034,204, filed on Feb. 24, 2011, now Pat. No. 8,234,239, which is a continuation of application No. 11/845,340, filed on Aug. 27, 2007, now Pat. No. 7,917,465.

(51) Int. Cl.
*G06F 17/00* (2006.01)
*G06F 17/30* (2006.01)

(52) U.S. Cl.
USPC .................... 707/602; 707/706; 705/14.49

(58) Field of Classification Search
None
See application file for complete search history.

*Primary Examiner* — Uyen Le
(74) *Attorney, Agent, or Firm* — Pillsbury Winthrop Shaw Pittman LLP

(57) ABSTRACT

The method according to one embodiment of the present invention comprises retrieving one or more terms or phrases comprising an instant messaging conversation in which one or more users are participating. One or more term vectors comprising one or more vector terms associated with the one or more retrieved terms or phrases comprising the instant messaging conversation are generated and one or more vector terms are selected from said term vectors. The one or more selected vector terms are displayed to the one or more users participating in the instant messaging conversation. An indication of a user selection of a given displayed vector term is received and one or more content items responsive to the selected vector term are identified.

20 Claims, 3 Drawing Sheets

US 8,666,932 B2

SYSTEM AND METHOD FOR PROVIDING VECTOR TERMS RELATED TO INSTANT MESSAGING CONVERSATIONS

CLAIM OF PRIORITY

This application is a continuation of and claims priority to U.S. Ser. No. 13/034,204, filed Feb. 24, 2011, now U.S. Pat. No. 8,234,239, which is a continuation of U.S. Ser. No. 11/845,340, filed Aug. 27, 2007, now U.S. Pat. No. 7,917,465, which are hereby incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention disclosed herein relates generally to providing search results to a user. More specifically, the invention relates to providing vector terms that may be used to retrieve content associated with one or more terms or phrases in an instant messaging conversation.

BACKGROUND OF THE INVENTION

Current technologies allow users to communicate online via instant messaging applications, which provide users with the ability to communicate using text messages in near real-time. A first user of an instant messaging application may download or otherwise access an instant messaging client via a network, which allows the user to enter one or more terms or phrases. The terms or phrases entered by the first user may be delivered over a network, such as the Internet, to a second user that also downloads or otherwise accesses an instant messaging client that a given instant messaging application provides. The instant messaging client of the second user displays the terms or phrases that the first user enters.

Similar to spoken conversations, conversations between a first and second user via an instant messaging application may include a plurality of terms that pertain to a variety of topics, such as weather, sports, cars, vacations, clothing, computers, employment, etc. The terms or phrases that appear in a given instant messaging application may be related to a variety of content that a given user may also access via a network, such as the Internet. For example, in a given instant messaging conversation, a first user may deliver a second user a variety of terms or phrases, in which the term "Caribbean cruise" appears. The term "Caribbean cruise" may be associated with a variety of content items that the user may access via the Internet, including, but not limited to, advertisements, web pages, video clips, etc. The term "Caribbean cruise" may also be associated with one or more related terms or phrases, such as "Jamaica vacations," "Nassau Vacations," "Bahamas," "summer vacations," etc., with which a user may provide to a search engine to access additional content.

Current instant messaging and search techniques, however, do not identify related terms or phrases with which a user may access content associated with the one or more terms or phrases appearing in a given instant messaging conversation. A user of an instant messaging application that wishes to identify content associated with a given term or phrase appearing in an instant messaging conversation is required to perform a search, such as through the use of a browser, to identify content responsive to a term or phrase. For example, a user that wishes to identify content, such as web pages or advertisements, responsive to a given term or phrase appearing in an instant messaging conversation in which the user is participating is required to enter the term or phrase into a search engine that the user may access via a browser. Thereafter, the user may be presented with responsive content, as well as one or more related terms or phrases that the user may utilize to perform additional searches for responsive content.

Accordingly, there exists a need in the art to provide users of instant messaging applications with vector terms, which may be used to access responsive content that is related to a conversation in which the user is participating. Embodiments of the present invention provide solutions wherein vector terms related to one or more users' instant messaging conversation are provided to the users during an instant messaging conversation, allowing the user to retrieve content associated with the one or more vector terms.

SUMMARY OF THE INVENTION

The present invention is directed towards systems, methods and computer readable media comprising program code for providing one or more vector terms with which content items may be retrieved, the one or more vector terms related to one or more terms or phrases comprising an instant messaging conversation. The method of the present invention comprises retrieving one or more terms or phrases comprising an instant messaging conversation in which one or more users are participating. According to one embodiment of the present invention, retrieving one or more terms or phrases comprising an instant messaging conversation comprises retrieving one or more terms or phrase from an instant messaging client.

The method of the present invention further comprises generating one or more term vectors comprising one or more vector terms associated with the one or more retrieved terms or phrases comprising the instant messaging conversation. One or more vector terms are selected from said term vectors, which may comprise selecting a predetermined number of vector terms from a given term vector.

The one or more selected vector terms are displayed to the one or more users participating in the instant messaging conversation. According to one embodiment of the present invention, the one or more vector terms are displayed in an instant messaging client. According to another embodiment of the present invention, the one or more vector terms are displayed in a browser.

An indication of a user selection of a given displayed vector term is received and one or more content items responsive to the selected vector term are identified. According to one embodiment of the present invention, the selected vector term is delivered to a search engine, and the one or more content items responsive to the selected vector term, as identified by the search engine, are retrieved. The one or more content items identified as responsive to the selected vector term may thereafter be displayed.

The present invention is further directed towards a system for providing one or more vector terms with which content items may be retrieved, the one or more vector terms related to one or more terms or phrases comprising an instant messaging conversation. The system of the present invention comprises a vector term generator operative to generate one or more term vectors comprising one or more vector terms associated with one or more terms or phrases comprising an instant messaging conversation. The system of the present invention further comprises an instant messaging component operative to retrieve one or more terms or phrases comprising an instant messaging conversation in which one or more users are participating. According to one embodiment of the present invention, the instant messaging component is operative to retrieve an instant messaging conversation from an instant messaging client.

The instant messaging component is further operative to display one or more vector terms identified by the vector term generator to the one or more users participating in the instant messaging conversation. According to one embodiment of the present invention, the instant messaging component is operative to deliver the one or more retrieved terms or phrases comprising an instant messaging conversation to the vector term generator and receive one or more term vectors comprising one or more vector terms. The instant messaging component thereafter selects one or more vector terms from the one or more term vectors, which may comprise selecting a predetermined number of vector terms from the one or more term vectors. The instant messaging component may display the one or more selected vector terms, which may comprise displaying the one or more vector terms in an instant messaging client or in a browser.

The instant messaging component is further operative to receive an indication of a user selection of a given displayed vector term and display one or more content items responsive to the selected vector term. According to one embodiment of the present invention, the system of the present invention further comprises a search engine operative to receive a selected vector term from the instant messaging component and identify one or more content items responsive to the selected vector term. The instant messaging component may display the one or more content items identified as responsive to the selected vector term by the search engine to the user that selected a given vector term.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
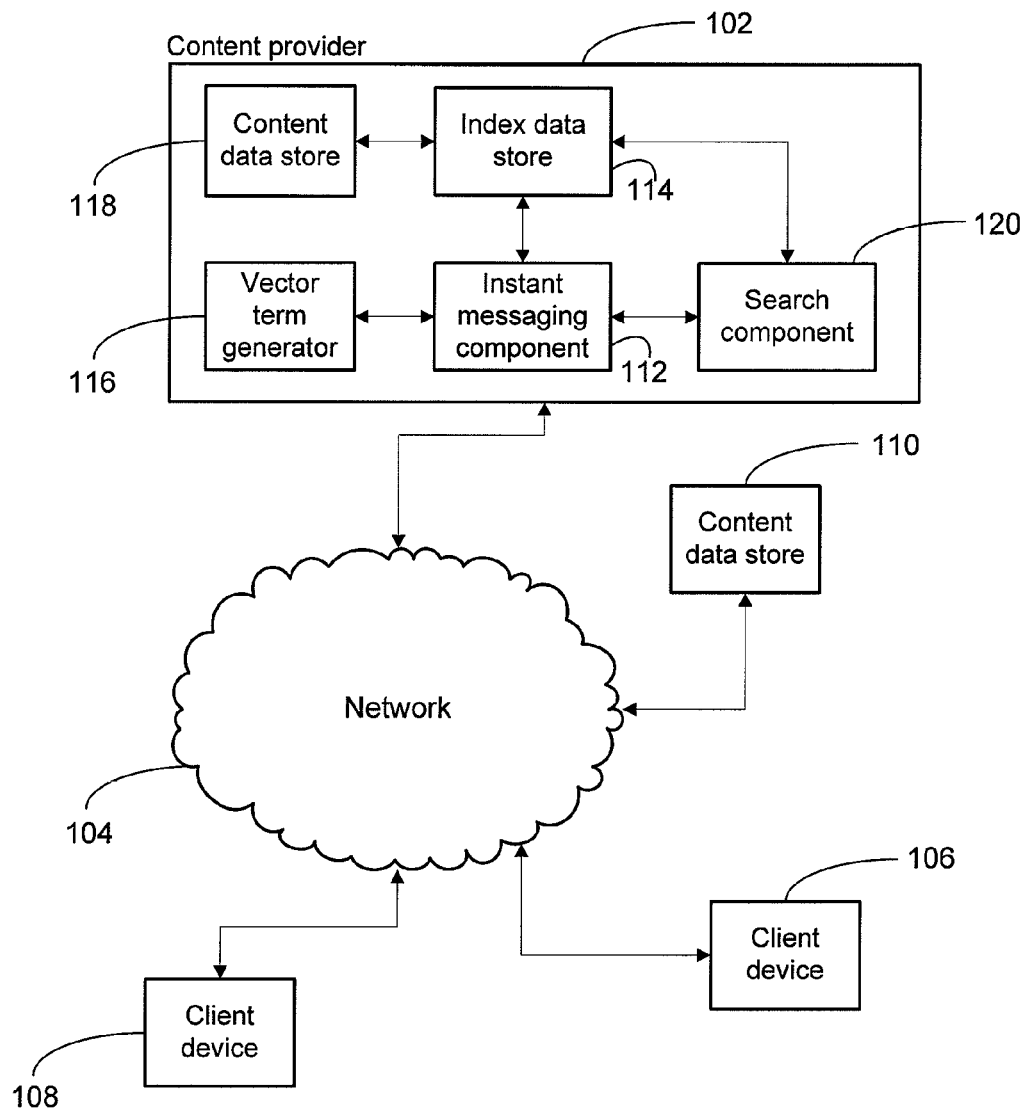
FIG. 1 presents a block diagram illustrating a system for providing vector terms with which content items related to an instant messaging conversation may be retrieved, according to one embodiment of the present invention.

FIG. 1 presents a block diagram illustrating a system for providing vector terms to retrieve content items for one or more users participating in an instant messaging conversation. According to the embodiment that FIG. 1 illustrates, one or more client devices 106 and 108 are communicatively coupled to a network 104, which may include a connection to one or more local and wide area networks, such as the Internet. According to one embodiment of the invention, a given client device 106 and 108 is general-purpose personal computer comprising a processor, transient and persistent storage devices, input/output subsystem and bus to provide a communications path between components comprising the general-purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

A given client device 106 and 108 may be in communication with a content provider 102. The content provider 102 may maintain an instant messaging component 114 providing users of client devices 106 and 108 with access to one or more instant messaging applications, e.g., a web based instant messaging application. For example, a given user of a client device 106 and 108 may access the instant messaging component 114 via the network 104, which may allow the user to download a given instant messaging client, such as the Yahoo! Messenger client, for local installation and execution on the client device 106 and 108

The one or more instant messaging applications provided by the instant messaging component 112 allows a first user of client device 106 and 108 to communicate with a second user of a client device 106 and 108 via the network 104. A given user of a client device 106 and 108 that downloads a given instant messaging client may enter one or more terms or phrases, such as through use of a keyboard, in the instant messaging client and deliver the one or more terms or phrases to another user of a client device 106 and 108 communicatively coupled to the network 104 that also executing an instance of the instant messaging client. Similarly, the second user of a client device 106 and 108 may deliver one or more terms or phrases to the first user of a client device 106 and 108 via the network by entering one or more terms or phrases into the instant messaging client. Communication thereby evolves as a conversation between the first user and the second user, which may include a plurality of second users.

The instant messaging component 112 at the content provider 102 is operative to retrieve the one or terms or phrases delivered to and from a first user of a client device 106 and 108 and a second user of a client device 106 and 108 participating in a given instant messaging conversation. According to one embodiment of the present invention, the instant messaging component 112 is operative to periodically retrieve the one or more terms or phrases one or more users of client devices 106 and 108 participating in a given instant messaging conversation exchange. For example, the instant messaging component 112 may be operative to retrieve the one or more terms or phrases exchanged between users of client devices 106 and 108 participating in a given instant messaging conversation every twenty seconds or every one minute. According to another embodiment of the present invention, the instant messaging component 112 is operative to retrieve the one or more terms or phrases on the basis of the number of terms or phrases comprising a given conversation. For example, the instant messaging component 112 may retrieve every one hundred terms comprising a given conversation.

The one or more terms or phrases that the instant messaging component 112 retrieves from a given instant messaging conversation are delivered to a vector term generator 116 at the content provider 102. The vector term generator 116 may be operative to analyze the one or more terms or phrases comprising the conversation that the instant messaging component 112 retrieves and generate one or more term vectors. The generation of term vectors is described more fully in commonly owned U.S. Pat. No. 6,947,930, entitled "SYSTEM AND METHOD FOR INTERACTIVE SEARCH QUERY REFINEMENT," which was filed on Apr. 25, 2003, the disclosure of which is hereby incorporated by reference in its entirety. The vector term generator 116 may be further operative to extract the most relevant vector terms from a given vector. In one embodiment, the vector term generator 116 may a set limit on the number of returned vector terms. In an alternative embodiment, the number of vector terms that the vector term generator 116 selects may be a percentage of the total number of vector terms that the vector term generator 116 generates. Other thresholds should be apparent to those of skill in the art.

After the vector terms are determined on the basis of the one or more terms or phrases comprising the conversation that the instant messaging component 112 retrieves, the vector term generator 116 returns the vector terms to the instant messaging component 112. The one or more vector terms are thereafter displayed to the one or more users of client devices 106 and 108 participating in the instant messaging conversation. According to one embodiment of the present invention, the one or more vector terms are displayed in the instant messaging client.

A user may select one or more of the displayed vector terms through use of a selection device, such as a mouse or a keyboard. The instant messaging component 112 is operative to detect user selection of a given vector term and upon detecting selection of a given vector term by a user of a client device, deliver the selected vector term to a search component 120 at the content provider. The search component 120 may be operative to search one or more content data stores, 110 and 118, for content items, such as web pages, residing thereon that are responsive to a given vector term.

According to the embodiment illustrated in FIG. 1, the search component 120 utilizes an index data store 114 to identify a set of one or more content items from a content data store 110 and 118 that fall within the scope of one or more vector terms selected by a user of a client device 106, and 108. The index data store 114 may comprise a list of word location pairs that, given a vector term, is correlated with one or more content items associated with the vector term that are maintained in one or more local or remote content data stores 110 and 118.

The search results identified by the search component 120 may be displayed to the user of the client device 106 and 108 that selected the given vector term. For example, the search component 120 may provide the search results responsive to the one or more vector terms ordered in accordance with a determined relevancy to the vector term. According to one embodiment of the present invention, the search results identified as responsive to the vector term selected by the user of the client device 106 and 108 are displayed in a browser on the client device 106 and 108. A resultant search results page (not pictured) that the search component 120 provides to a client device 106 and 108 may have links or references to one or more content items for selection by a user of the client device 106 and 108. Alternatively, the instant messaging component 112 may display the data comprising the search results page in an ancillary window, such as a pop-up window.

As previously described, the conversation between one or more users of participating in an instant messaging conversation may comprise a plurality of terms or phrases. Further, the duration of a given instant messaging conversation may continue for several minutes, hours, etc. Accordingly, the instant messaging component 112 is operative to periodically retrieve additional terms or phrases from the instant messaging conversation between one or more users of client devices 106 and 108 participating in an instant messaging conversation. The instant messaging component 112, through use of the vector term generator 116, may continue to periodically retrieve terms or phrases from the instant messaging conversation between one or more users of client devices 106 and 108 and refine the vector terms displayed to the one or more users, e.g., in response to changing topic threads comprising a given instant messaging conversation. Accordingly, users of client devices 106 and 108 may continue to receive vector terms that are relevant with respect to the instant messaging conversation. The users of client devices 106 and 108 participating in the instant messaging conversation may thus continue to retrieve content, through use of the one or more vector terms, that is associated with the instant messaging conversation.

Those of skill in the art recognize that while the system of FIG. 1 illustrates two client devices 106 and 108, additional client devices may be communicatively coupled to the network 104. Accordingly, a plurality of users of client devices may participate in a given instant messaging conversation. The instant messaging component 112 is operative to retrieve the one or more terms or phrases comprising a given instant messaging conversation from a plurality of client devices that may participate in a given instant messaging conversation. For example, the instant messaging component 112 is operative to retrieve the one or more terms or phrases comprising a given instant messaging conversation occurring in a chat room between a plurality of users.

Figure 2:
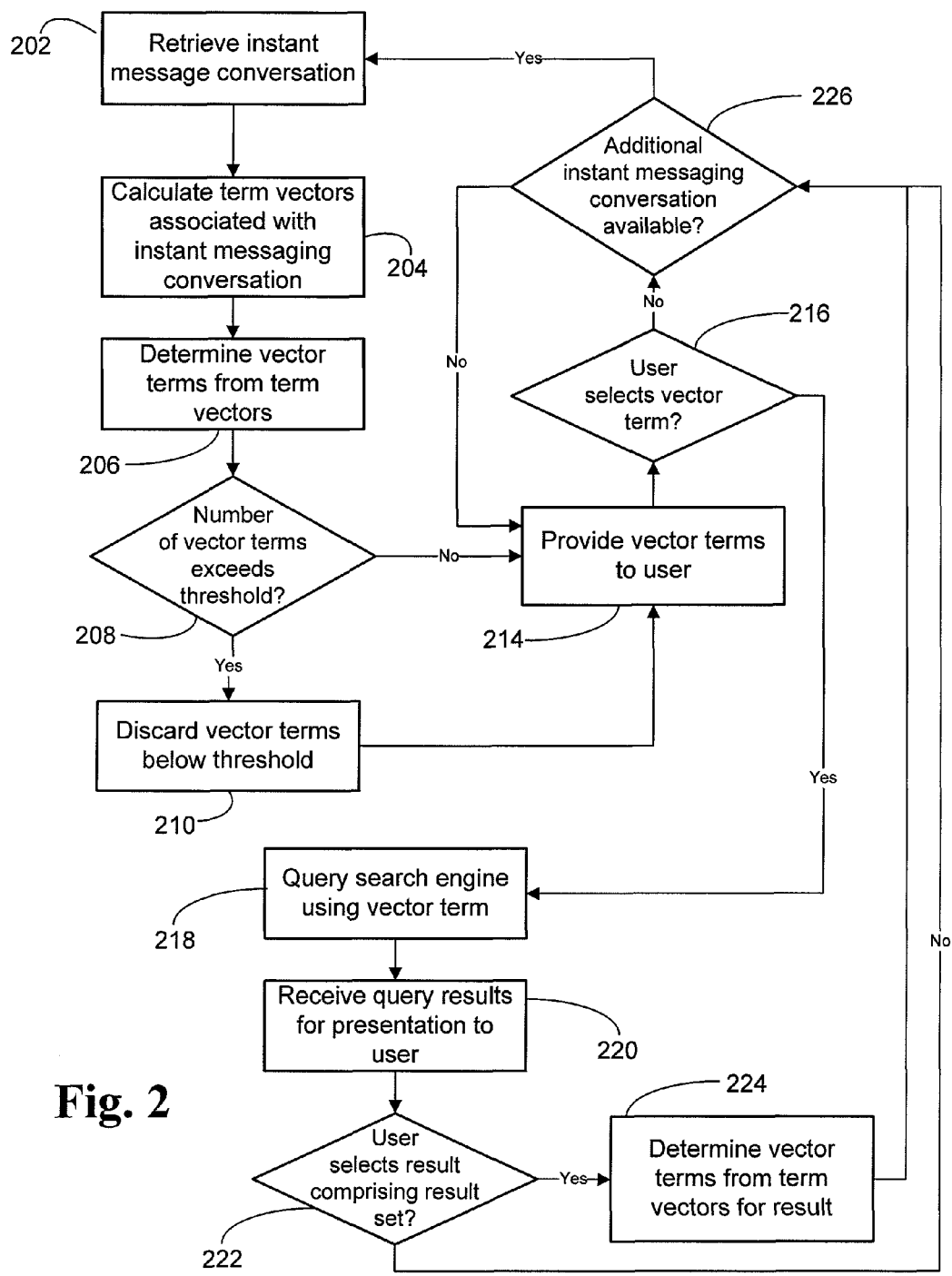
FIG. 2 presents a flow diagram illustrating a method for providing one or more vector terms to one or more participants of an instant messaging conversation, according to one embodiment of the present invention.

FIG. 2 presents a flow diagram illustrating one embodiment of a method for providing one or more vector terms to one or more participants of a given instant messaging conversation. According to the embodiment illustrated in FIG. 2, the method begins with retrieval of the instant messaging conversation occurring between one or more users of client devices that are participating in a given instant messaging conversation. As previously described, users of client devices may participate in an instant messaging conversation by downloading or otherwise accessing a given instant messaging client. A user may enter one or more terms or phrases into an instant messaging client and deliver the one or more terms or phrases to another user that has downloaded or otherwise accessed an instant messaging client. Accordingly, retrieval of the instant messaging conversation, step 202, illustrated in FIG. 2 may comprise retrieval of the one or more terms or phrases entered by the one or more users of client devices participating in a given instant messaging conversation.

According to the embodiment illustrated in FIG. 2, term vectors are calculated that are associated with the one or more terms or phrases comprising the retrieved instant messaging conversation, step 204. Term vectors are commonly known in the art and may comprise a number of relevant or important terms that are associated within the one or more terms or phrases comprising a given instant messaging conversation. When generating a term vector, weights may be associated with a given term within the vector, resulting in weighted vector that is operative to identify the most relevant terms or phrases within an instant messaging conversation. The generation of term vectors is described fully in previously incorporated U.S. Pat. No. 6,947,930, the disclosure of which is hereby incorporated by reference in its entirety. In one embodiment, only a subset of the terms or phrases comprising a given instant messaging conversation is used to generate term vectors. The subset utilized may correspond to the top N relevant terms or phrases within a given instant messaging conversation. For example, the one or more terms or phrases within a given instant messaging conversation appearing at least N times may be used to generate the one or more term vectors. Similarly, the N terms or phrases appearing with the greatest frequency within a given instant messaging conversation may be used to generate the one or more term vectors. Alternatively, a plurality of terms or phrases within an instant messaging conversation may be utilized to generate a comprehensive set of vectors from the result set.

According to the embodiment illustrated in FIG. 2, one or more vector terms may be extracted from the one or more term vectors, step 206. A threshold may indicate that the number of vector terms may not surpass a threshold, step 210. In accordance with one embodiment, this threshold may be determined prior to the calculation of vector terms. In an alternative embodiment, the threshold may be determined based on the number of returned term vectors or the number of terms or phrases comprising the instant messaging conversation. Various methodologies may be employed to determine which terms from a given vector may be selected for use. For example, if a threshold of M vector terms is selected for a plurality of N vectors, an algorithm may be executed that selects the highest ranked vector terms from vector 1, the highest term from vector 2, etc., until the highest term from vector N is selected. The algorithm may then repeat the process, starting with the second highest term from vector 1. This process continues until reaching a threshold of N terms. Alternatively, an algorithm may scan the one or more term vectors to generate a single vector of a plurality of terms, selecting the highest ranked N terms from the single vector. Finally, if the number of vector terms is within the defined threshold, step 208, the vector terms are provided to the user, step 214. If the number of vector terms is above the defined threshold, step 208, a subset of the vector terms are discarded, step 210.

After a number of vector terms below a defined threshold are selected, the terms are provided to the user, step 214. The vector terms may be provided as hyperlinks displayed as part of a search result page on a client display. For example, a plurality of vector terms may be displayed as text hyperlinks in a window or similar HTML container, such as a DIV element. The vector terms may be displayed in conjunction with the instant messaging client with which the one or more users participating in the retrieved instant messaging conversation enter one or more terms or phrases.

A given user participating in the instant messaging conversation to which the one or more vector terms are displayed may select one or more of the displayed vectors terms through use of a selection device, such as a mouse or a keyboard. For example, a given user may select one or more vector terms displayed on the user's client device, such as by clicking on a vector term represented by a hyperlink.

A check is performed to determine whether a given user participating in the instant messaging conversation to which the one or more vector terms are displayed selects a given vector term, step 216. If a user selects a given displayed vector term, a search engine is queried using the selected vector term, step 218, according to methods described herein. A client device with which the user queries the search engine receives the query results for presentation to the user, step 220, wherein a check is performed to determine if the user selects a given result comprising the query results, step 222. Where the user does not select a result comprising the query results, e.g., the user does not select a link to a content item that a search result page displays, program flow advances to step 226, where a check is performed to determine whether additional instant messaging conversation, comprising one or more terms or phrases, is available for retrieval. If the user selects a result comprising the query results, the vector terms are determined from term vectors for the result, step 224, which may provide addition terms for presentation to the user, e.g., step 214.

If a user does not select a given displayed vector terms, an additional check is performed to determine whether additional instant messaging conversation, comprising one or more terms or phrases, is available for retrieval, step 226. If additional instant messaging conversation is available, the additional instant messaging conversation, comprising one or more terms or phrase, is retrieved. One or more vector terms associated with the additional retrieved instant messaging conversation are thereafter identified and displayed to the one or more users participating in the instant messaging conversation.

Figure 3:
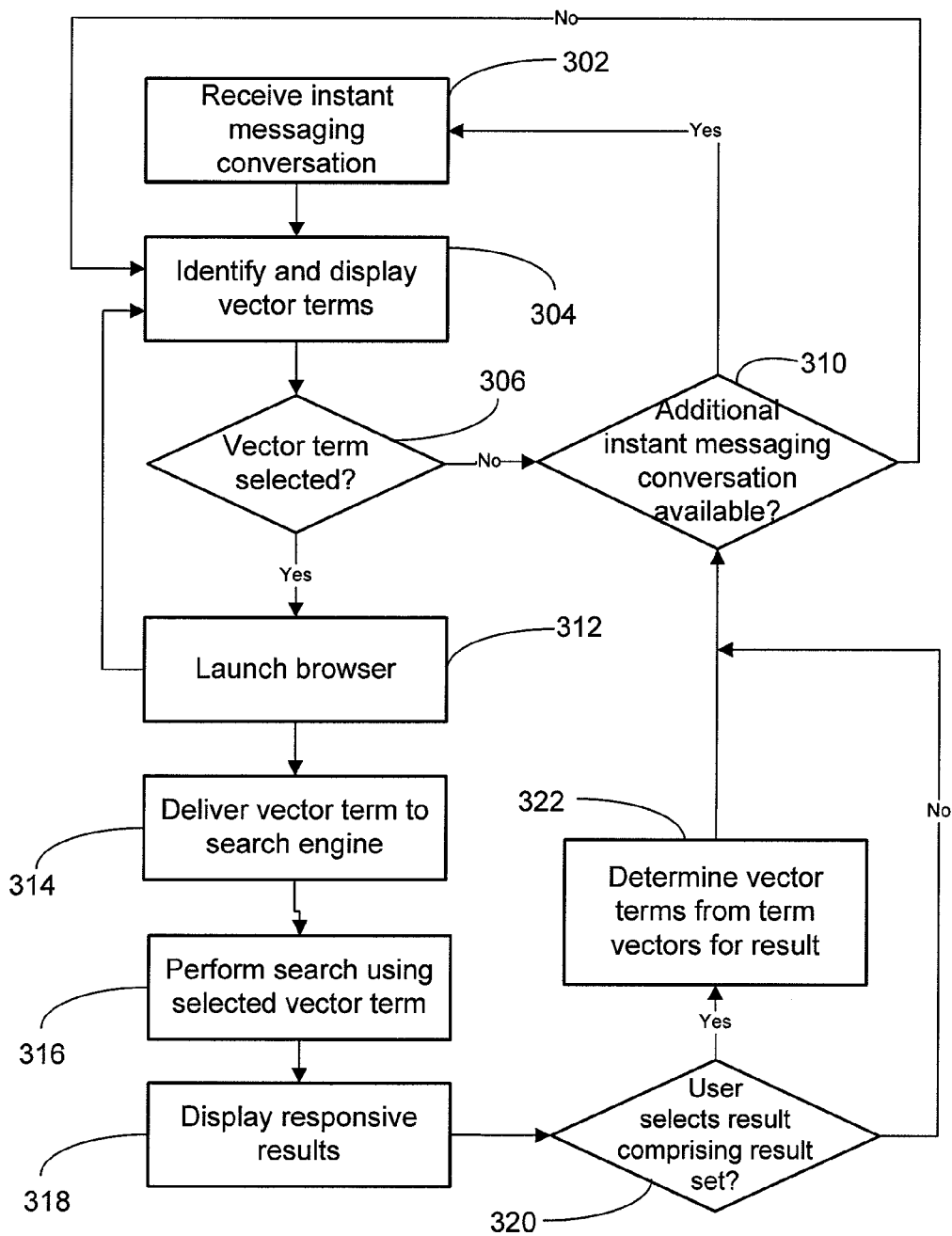
FIG. 3 presents a flow diagram illustrating one embodiment of a method for displaying one or more content items responsive to a given vector term, according to one embodiment of the present invention.

FIG. 3 presents a flow diagram illustrating one embodiment of a method for retrieving one or more content items responsive to a given vector term displayed and selected by a user participating in a given instant messaging conversation. According to the embodiment illustrated in FIG. 3, an instant messaging conversation is retrieved, which as previously described, comprises one or more terms or phrases entered by users of client devices participating in an instant messaging conversation, step 302. One or more vector terms associated with the one or more retrieved terms or phrases comprising the instant messaging conversation are identified and displayed to the one or more users of client devices participating in the retrieved instant messaging conversation, step 304.

A user of a client device participating in the retrieved instant messaging conversation may select one or more of the displayed vector terms, such as through of a mouse or keyboard. A check is performed to determine whether one or more users participating in the retrieved instant messaging conversation have selected one or more displayed vector terms, step 306. For example, when presenting the vector terms to the user, the actions of the user may be monitored to determine if the user selects one of the vector terms. In one embodiment, the monitoring of user selection may be accomplished with programming code construct such as JavaScript event handlers.

If the one or more users participating in the retrieved instant messaging conversation do not select one or more of the displayed vector terms, an additional check is performed to determine whether additional instant messaging conversation is available for retrieval, step 310. For example, a check may be performed to determine whether the one or more users participating in the retrieved instant messaging conversation have entered one or more additional terms or phrases into the instant messaging clients with which the users are participating in the instant messaging conversation. If additional instant messaging conversation is available, the additional instant messaging conversation, comprising one or more terms or phrases, is retrieved, step 302. If not additional instant messaging conversation is available, the one or more vector terms identified as associated with the retrieved instant messaging conversation continue to be displayed, step 304.

According to the embodiment illustrated in FIG. 3, if a given user participating in the retrieved instant messaging conversation selects a displayed vector term, the browser of the user that selected the vector term is launched, step 312. The selected vector term is thereafter delivered to a search engine, step 314. For example, as previously described, the one or more vector terms displayed to a given user participating in an instant messaging conversation may comprise hyperlinks, which when selected result in the launching of the user's browser and delivery of the selected vector term to a particular search engine. In one embodiment, HTML may be utilized to hyperlink the vector terms to a second page.

A search is thereafter performed by the search engine to identify one or more content items responsive to the selected vector term, step 316. The one or more content items identified as responsive to the selected vector term may comprise a plurality of content, including, but not limited to, one or more web page, advertisements, documents, audio content, or video content. The one or more content items identified as responsive to the selected vector term are thereafter displayed to the user that selected the vector term, step 318. For example, the one or more responsive content items may be displayed in the browser launched on the user's client device, as described above. The one or more responsive content items may be displayed in a list or similar ranking to indicate the degree to which the one or more responsive content items are relevant with respect to the selected vector term.

A check may be performed to determine if the user selects a given result comprising the query results, step 320. Where the user does not select a result comprising the query results, e.g., the user does not select a link to a content item that a search result page displays, program flow advances to step 310, where a check is performed to determine whether additional instant messaging conversation, comprising one or more terms or phrases, is available for retrieval. If the user selects a result comprising the query results, the vector terms are determined from term vectors for the result, step 322, which may provide addition terms for presentation to the user, e.g., step 304.

FIGS. 1 through 3 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

I claim:

1. A computerized method for providing one or more of relevant terms on the basis of which content items may be retrieved, the one or more relevant terms related to one or more terms or phrases comprising an exchange of electronic messages, the method comprising:
   retrieving, periodically during an exchange of one or more electronic messages, one or more terms or phrases used in the exchange of one or more electronic messages in which one or more users are participating;
   electronically providing one or more relevant terms associated with the one or more retrieved terms or phrases to the one or more users;
   receiving an indication of a user selection of the one or more relevant terms; and
   retrieving one or more content items responsive to a query associated with the selected one or more relevant terms.

2. The method of claim 1 further comprising selecting most relevant terms or phrases according to at least one criterion within the exchange of one or more electronic messages.

3. The method of claim 1 further comprising selecting a predetermined number of relevant terms from a given term vector.

4. The method of claim 1 further comprising providing the one or more relevant terms in an electronic messaging client.

5. The method of claim 1 further comprising refining the one or more relevant terms in response to changing topic threads in the exchange of one or more electronic messages.

6. The method of claim 1 wherein retrieving one or more content items comprises:
delivering a given provided relevant term to a search engine; and retrieving the one or more content items responsive to the given provided relevant term as identified by the search engine.

7. The method of claim 6 further comprising providing the one or more content items associated with the given provided relevant term.

8. A non-transitory computer readable media comprising program code for execution by a programmable processor to perform a method for providing one or more relevant terms for use in identifying advertisements, the computer readable media comprising:
program code for retrieving, periodically during an exchange of one or more electronic messages, one or more terms or phrases used in the exchange of one or more electronic messages in which one or more users are participating;
program code for electronically providing one or more relevant terms associated with the one or more retrieved terms or phrases to the one or more users;
program code for receiving an indication of a user selection of the one or more relevant terms; and
program code for retrieving one or more content items responsive to a query associated with the selected one or more relevant terms.

9. The computer readable media of claim 8 further comprising program code for selecting most relevant terms or phrases according to at least one criterion within the exchange of one or more electronic messages.

10. The computer readable media of claim 8 further comprising program code for selecting a predetermined number of relevant terms from a given term vector.

11. The computer readable media of claim 8 further comprising program code for providing one or more vector terms in an electronic messaging client.

12. The computer readable media of claim 8 further comprising program code for refining the one or more relevant terms in response to changing topic threads in the exchange of one or more electronic messages.

13. The computer readable media of claim 8 wherein the program code for identifying one or more content items comprises:
program code for delivering a selected relevant term to a search engine; and
program code for retrieving the one or more content items associated with the selected relevant term as identified by the search engine.

14. The computer readable media of claim 13 further comprising program code for providing the one or more content items associated with the selected relevant term.

15. A system for providing one or more relevant terms for use in identifying content items, the system comprising:
a messaging component having at least one processor and storage, wherein the processor is configured to:
retrieve, periodically during an exchange of one or more electronic messages, one or more terms or phrases used in the exchange of one or more electronic messages in which one or more users are participating;
provide one or more relevant terms associated with the one or more retrieved terms or phrases to the one or more users;
receive an indication of a user selection of the one or more relevant terms; and
retrieve one or more content items responsive to a query associated with the selected one or more relevant terms.

16. The system of claim 15 wherein the messaging component is operative to select most relevant terms or phrases according to at least one criterion within the exchange of one or more electronic messages.

17. The system of claim 15 wherein the messaging component is operative to:
deliver the one or more retrieved terms or phrases comprising the exchange of one or more electronic messages to a vector term generator;
receive one or more term vectors comprising one or more vector terms; and
select one or more vector terms from the one or more term vectors.

18. The system of claim 17 wherein the messaging component is operative to display the one or more selected vector terms in an electronic messaging client.

19. The system of claim 17 wherein the messaging component is operative to refine the one or more relevant terms in response to changing topic threads in the exchange of one or more electronic messages.

20. The system of claim 15 further comprising a search engine operative to:
receive a given displayed relevant term from the messaging component; and
identify one or more advertisements responsive to the given displayed relevant term.

* * * * *